United States Patent
Huang et al.

(10) Patent No.: US 8,165,650 B2
(45) Date of Patent: Apr. 24, 2012

(54) PORTABLE ELECTRONIC DEVICE

(75) Inventors: Lucas Huang, Shenzhen (CN); Lee-Han Ng, Shenzhen (CN); Chien-Chun Huang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 455 days.

(21) Appl. No.: 12/540,454

(22) Filed: Aug. 13, 2009

(65) Prior Publication Data
US 2010/0099468 A1  Apr. 22, 2010

(30) Foreign Application Priority Data
Oct. 20, 2008 (CN) .......................... 2008 1 0305022

(51) Int. Cl.
*H04M 1/02* (2006.01)

(52) U.S. Cl. .................................... 455/575.4; 455/572
(58) Field of Classification Search .................. 455/574, 455/575.1, 575.4; 361/814
See application file for complete search history.

(56) References Cited

U.S. PATENT DOCUMENTS

| | | | |
|---|---|---|---|
| 2002/0044768 A1* | 4/2002 | Noda et al. | 386/118 |
| 2007/0273786 A1* | 11/2007 | Ahn et al. | 348/373 |
| 2010/0093410 A1* | 4/2010 | Cho et al. | 455/575.4 |

* cited by examiner

*Primary Examiner* — Temesgh Ghebretinsae
*Assistant Examiner* — Gennadiy Tsvey
(74) *Attorney, Agent, or Firm* — Altis Law Group, Inc.

(57) ABSTRACT

A portable electronic device comprises a body member and a cover member. The body member includes a battery receiving space and a keypad. The cover member is slidably mounted to the body member along two opposite direction so as to respectively cover the battery receiving space and the keypad.

19 Claims, 7 Drawing Sheets

PORTABLE ELECTRONIC DEVICE

BACKGROUND

1. Technical Field

The present disclosure relates to portable electronic devices and, particularly, to a slide-type portable electronic device.

2. Description of Related Art

Batteries are used to provide power to portable electronic devices, e.g., mobile phones. Battery covers are usually provided to secure the battery within portable electronic devices.

A typical battery cover for an electronic device can be detachably mounted to a housing of portable electronic devices using a latching means, e.g., a locking pin latching into a locking hole.

However, to replace batteries, it is required to first detach the battery cover from the housing, then insert a new battery into the housing and finally lock the battery cover to the housing again. Thus, it is inconvenient for users, and the battery cover may subject to risk of being lost or misplaced.

Therefore, there is room for improvement within the art.

BRIEF DESCRIPTION OF THE DRAWINGS

Many aspects of a portable electronic device can be better understood with reference to the following drawings. These drawings are not necessarily drawn to scale, the emphasis instead being placed upon clearly illustrating the principles of the present adjustable fixture. Moreover, in the drawings like reference numerals designate corresponding sections throughout the several views.

DETAILED DESCRIPTION

Figure 1:
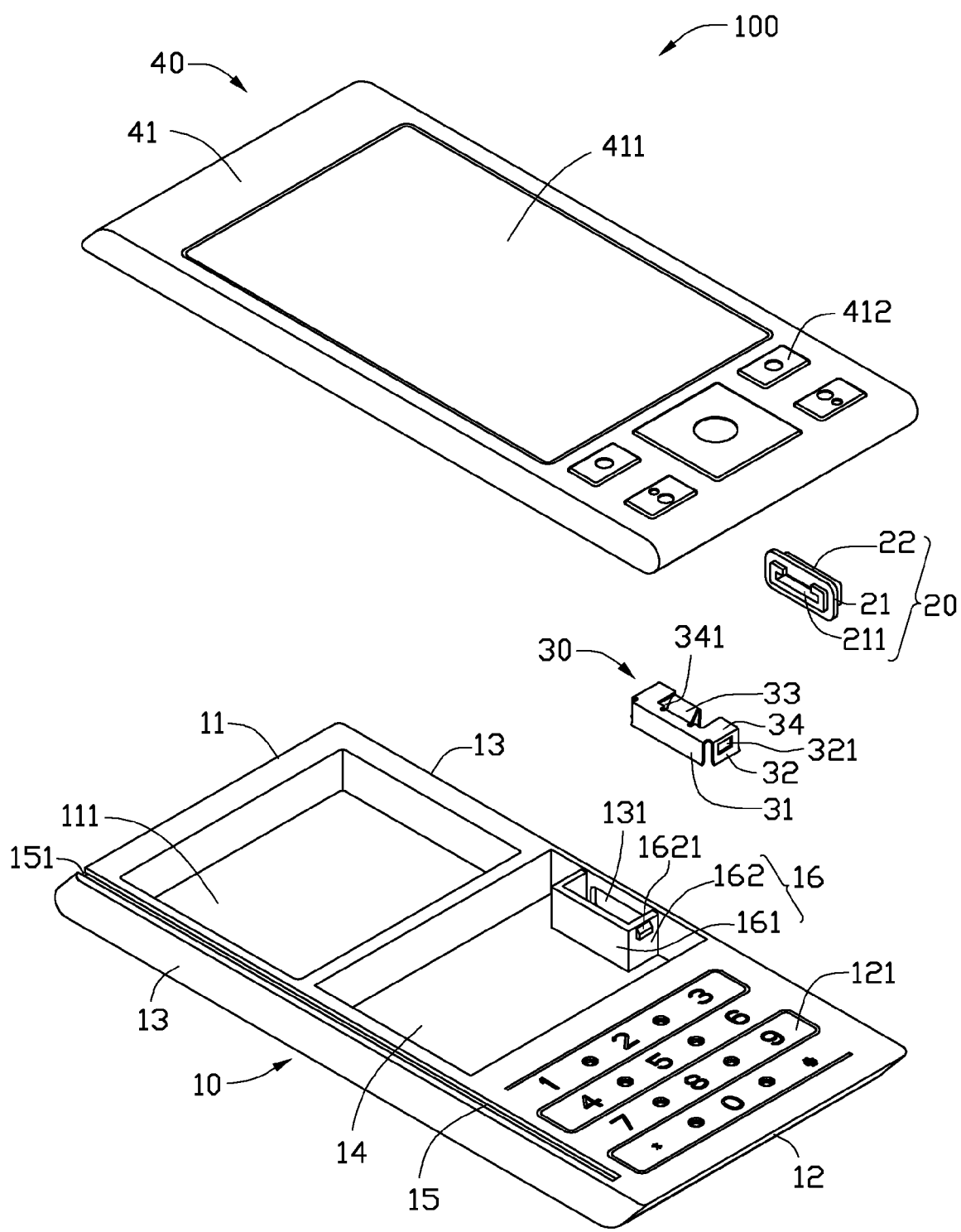
FIG. 1 is an isometric, exploded view of a portable electronic device, in accordance with an exemplary embodiment.
Figure 2:
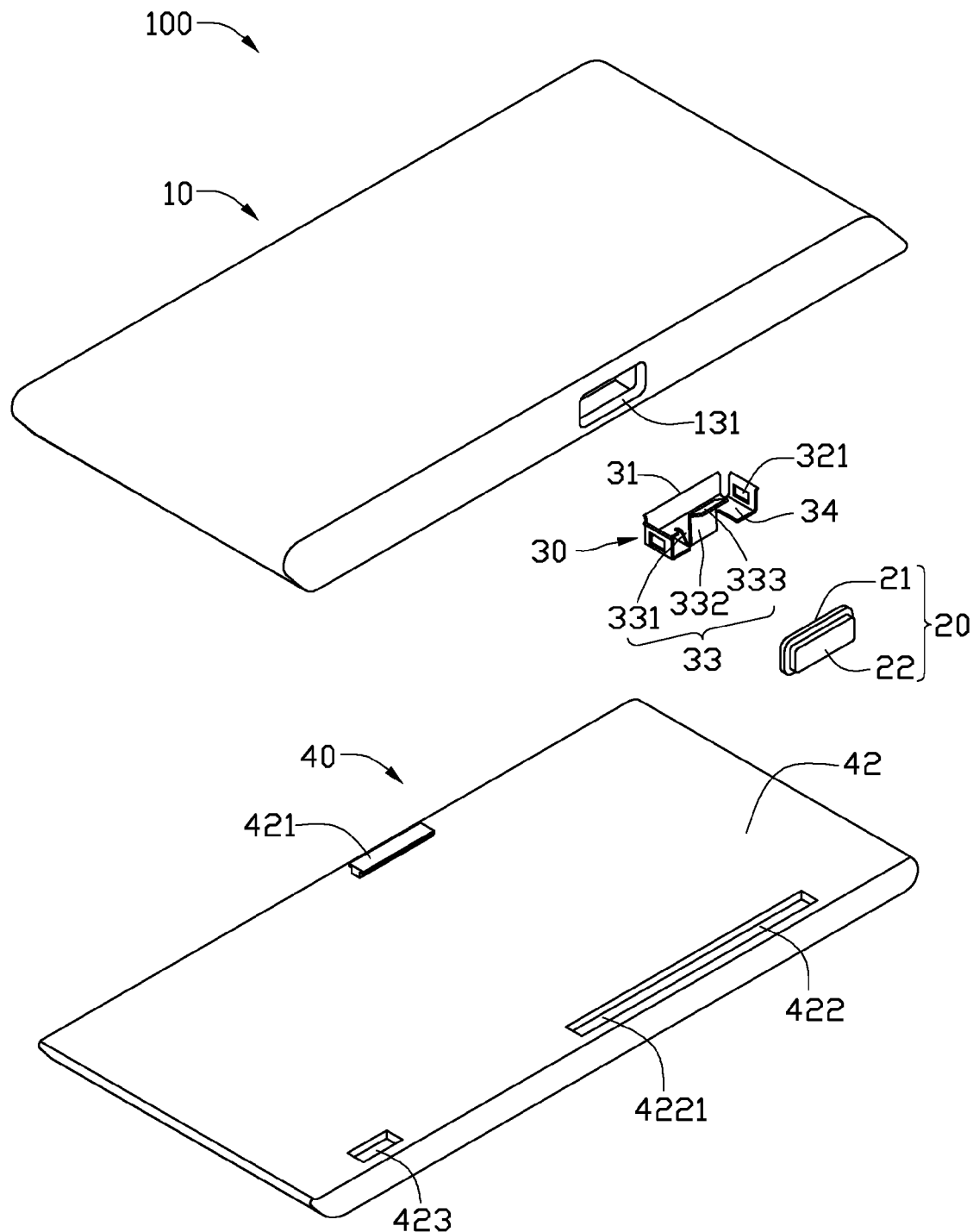
FIG. 2 is similar to FIG. 1, but viewed from another aspect.

FIGS. 1 and 2 show an exemplary portable electronic device 100. The portable electronic device 100 includes a body member 10, a button 20, a clamping member 30, and a cover member 40. The button 20 is mounted to the body member 10. The clamping member 30 is mounted in the body member 10, and used to resist the cover member 40. The cover member 40 is slidably mounted to the body member 10.

The body member 10 includes a top wall 11, a bottom wall 12, and two opposite sidewalls 13. The body member 10 further includes a battery receiving space 111 adjacent to the top wall 11, a keypad 121 adjacent to the bottom wall 12, and a component receiving space 14 defined between the battery receiving space 111 and the keypad 121. The battery receiving space 111 is used to accommodate a battery therein. The component receiving space 14 is used to accommodate electronic elements (not shown), e.g., printed circuit board therein. The keypad 121 is used to input signals, e.g., figures and symbols. The body member 10 further includes a sliding slot 15 and a mounting compartment 16. The sliding slot 15 is defined adjacent to one of the sidewalls 13 with an entry 151 in the top wall 11, used to slidably mount the cover member 40. In this embodiment, the mounting compartment 16 is a mounting cavity enclosed by a first wall 161, two second walls 162, and the other sidewall 13. The first wall 161 faces the sidewalls 13. The two second walls 162 are oppositely disposed and perpendicularly connect with the sidewall 13 and the first wall 161. Each second wall 162 includes a protrusion 1621, used to fasten the clamping member 30 thereon. The sidewall 13 facing the first wall 161 defines an opening 131, through which the button 20 resists the clamping member 30.

The button 20 has a "T"-shaped cross-section, and includes a main board 21 and an operating block 22 protruding from the main board 21. The dimension of the operating block 22 is smaller than that of the main board 21. The main board 21 defines a slit 211, used to receive part of the clamping member 30 therein. The operating block 22 is used to be pressed along the opening 131.

The clamping member 30 is an elastic member, and includes a first sheet 31, two second sheets 32, a resisting sheet 33, and a main sheet 34. The two second sheets 32 perpendicularly extending from two opposite sides of the main sheet 34. The two second sheets 32 are spaced from the first sheet 31. The first sheet 31 and the resisting sheet 33 are oppositely formed on another two sides of the main sheet 34. The first sheet 31 perpendicularly extends from the main sheet 34. The main sheet 34 defines a cutout 341 at a center thereof, used to receive the resisting sheet 33 therein. Each second sheet 32 defines a latching hole 321. Each latching hole 321 is configured to latch a corresponding protrusion 1621. The first sheet 31 elastically resists the first wall 161, thus securely mounting the clamping member 30 in the mounting compartment 16. The resisting sheet 33 is arcuate, and includes a connecting portion 331, a resisting portion 332, and a clamping portion 333. The connecting portion 331 connects with the main sheet 34. The resisting portion 332 resists the cover member 40, used to stably keep the cover member 40 at a position relative to the body member 10. The clamping portion 333 is received in the slit 211, and resists the button 20.

The cover member 40 has a similar shape as the body member 10. The cover member 40 includes an upper wall 41 and a lower wall 42 opposite to the upper wall 41. The upper wall 41 includes a screen 411 disposed at one end thereof, and several keys 412 disposed opposite to the screen 411. The lower wall 42 includes a sliding block 421, a sliding groove 422, and a positioning cavity 423. The sliding block 421 is disposed adjacent one side of the cover member 40, and is slidably received in the sliding slot 15 via the entry 151. The sliding groove 422 and the positioning cavity 423 are defined in the lower wall 42 and adjacent to another side of the cover member 40. The sliding groove 422 is parallel with the sliding slot 15, and is surrounded by a bottom wall 4221. The resisting portion 332 is received in the sliding groove 422, and resists the bottom wall 4221. Therefore, when an external force is cancelled, the cover member 40 can stop at any position during sliding relative to the body member 10 by a friction force between the bottom wall 4221 and the resisting portion 332. The positioning cavity 423 is used to latch with the resisting portion 332, thus positioning the cover member 40 at a position where the battery receiving space 111 is completely exposed.

Figure 3:
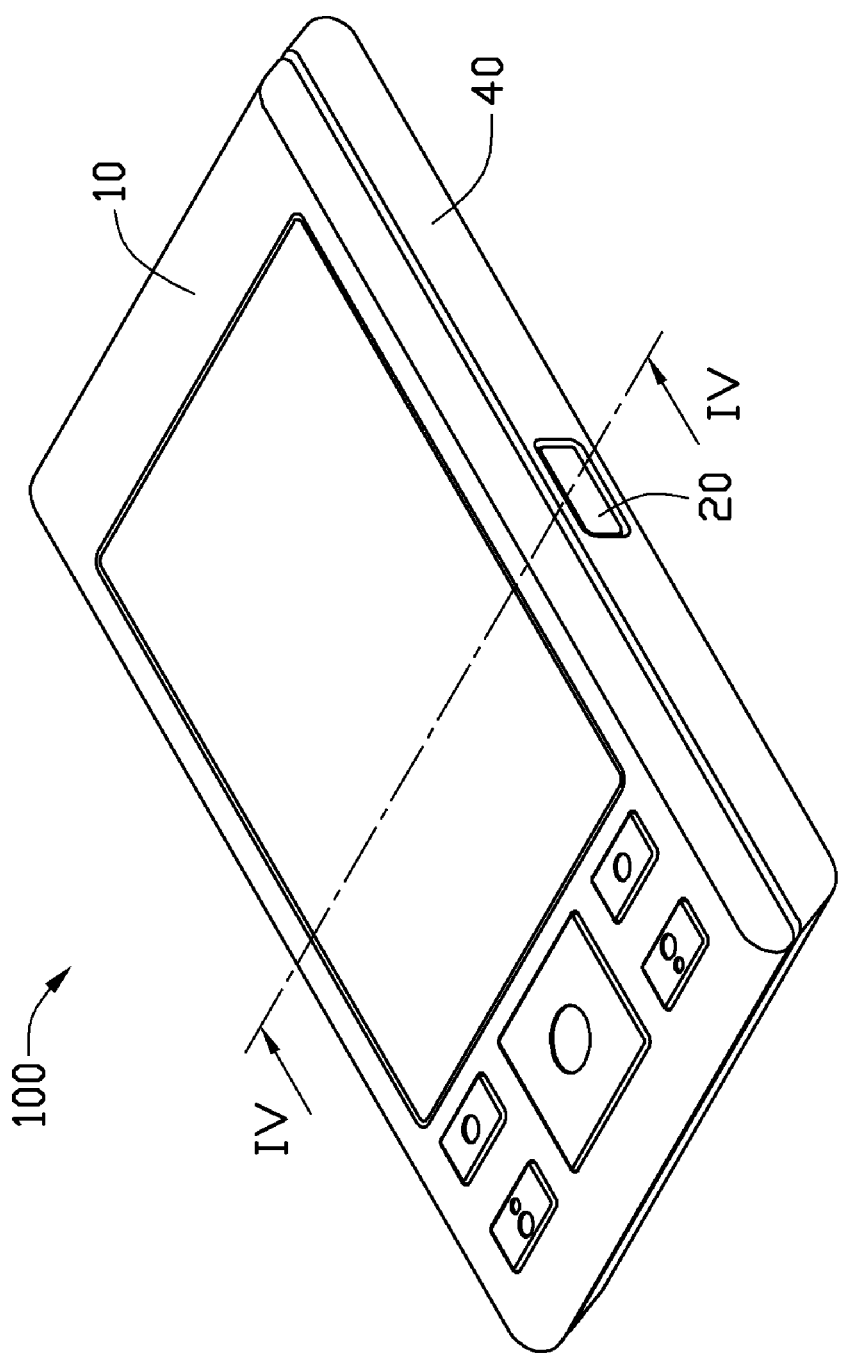
FIG. 3 is an assembled view of the portable electronic device shown in FIG. 1.
Figure 4:
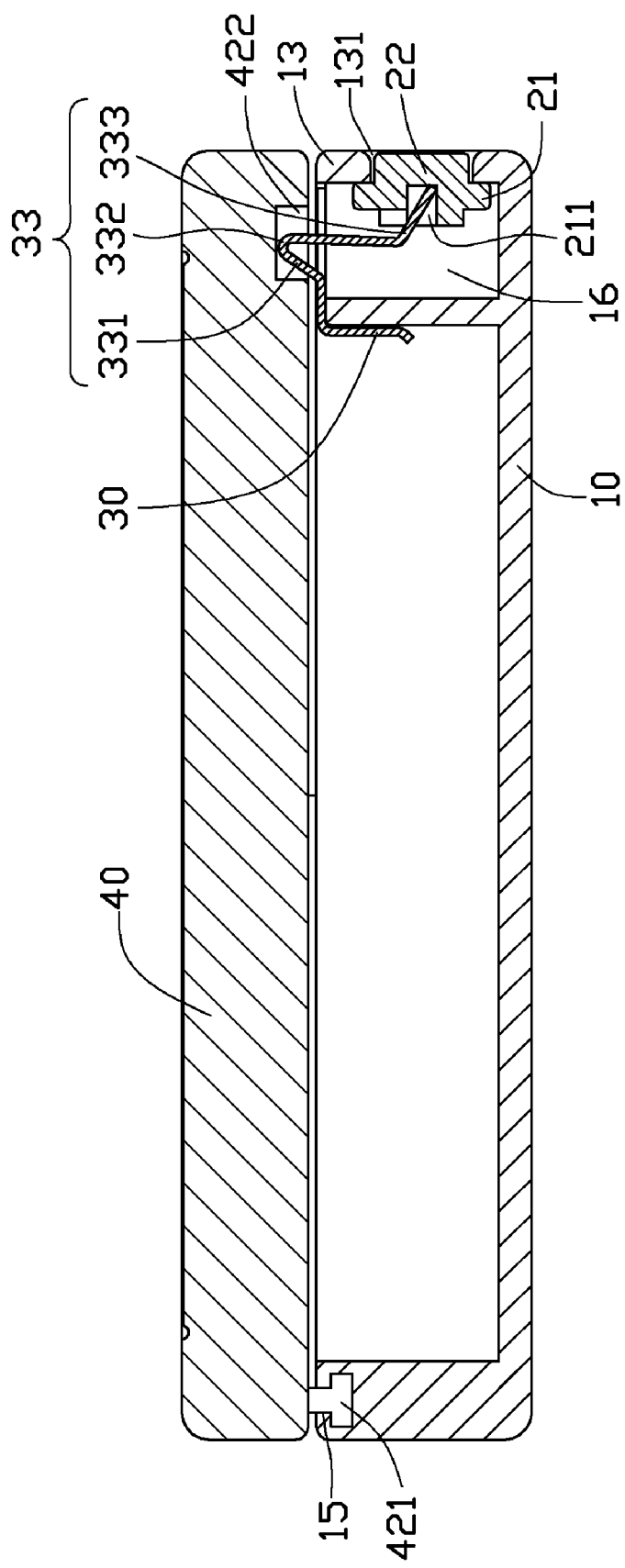
FIG. 4 is a cut-view of the portable electronic device taken along line IV-IV.

Referring to FIGS. 3 and 4, in assembly, the button 20 is inserted into the mounting compartment 16, with the operating block 22 received in the opening 131, and the main board 21 resisting the sidewall 13 of the body member 10. Then the clamping member 30 is mounted to the mounting compartment 16, with the clamping portion 333 partially received in the slit 211 of the button 20 to resist the button 20. At this time, the resisting portion 332 is facing away from the mounting compartment 16. The cover member 40 is then covered on the battery receiving space 111 and the keypad 121, and the sliding block 421 is inserted into the sliding slot 15 through the entry 151. Thus, the portable electronic device 100 has been assembled.

Figure 5:
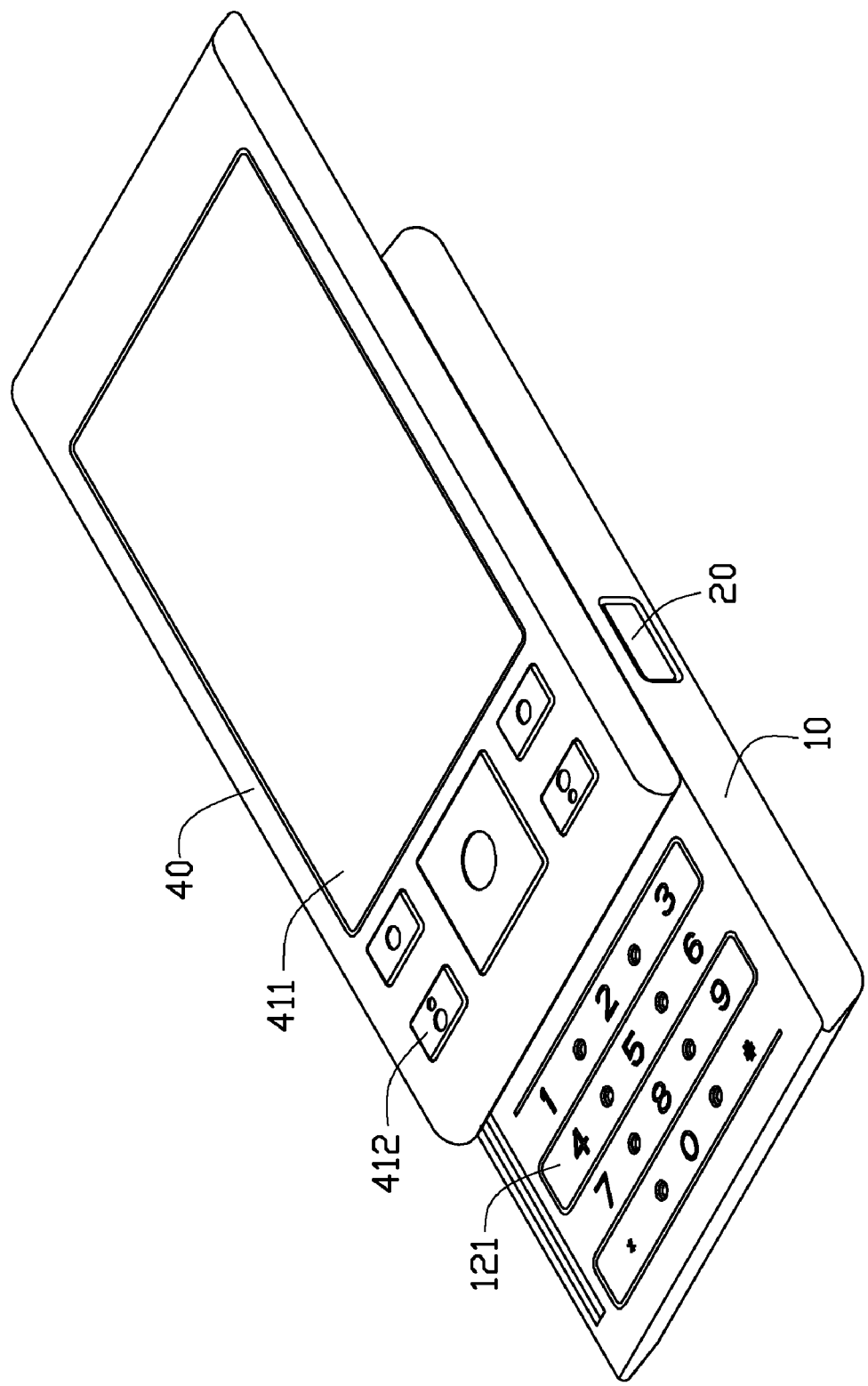
FIG. 5 is an isometric view of the portable electronic device shown in FIG. 3, with the keypad exposed.

Referring to FIG. 5, to expose the keypad 121, an external force is applied on the cover member 40 to drive the cover member 40 slide along the sliding groove 422 towards the top wall 11. When the keypad 121 is completely exposed, a friction between the resisting portion 332 and the bottom wall 4221 of the sliding groove 422 can stably maintain the cover member 40 at a position relative to the body member 10.

Figure 6:
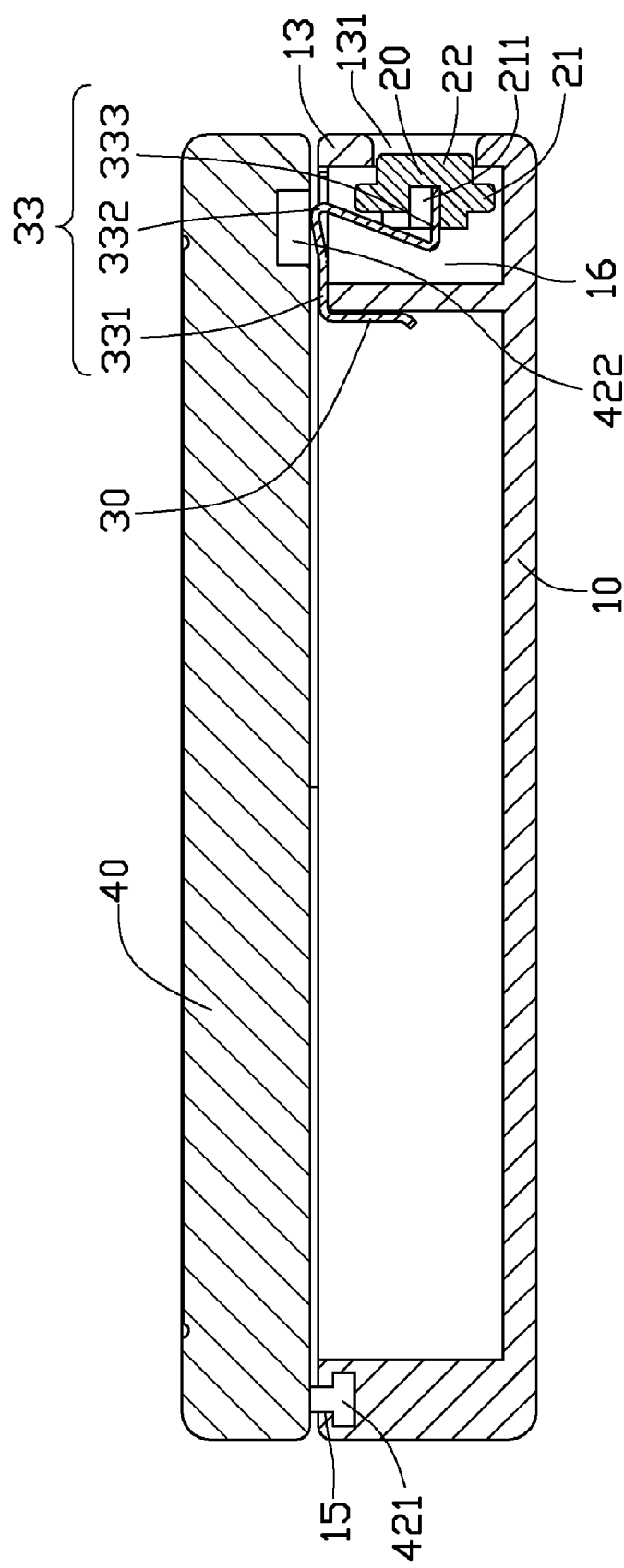
FIG. 6 is similar to FIG. 4, with the button pressed.
Figure 7:
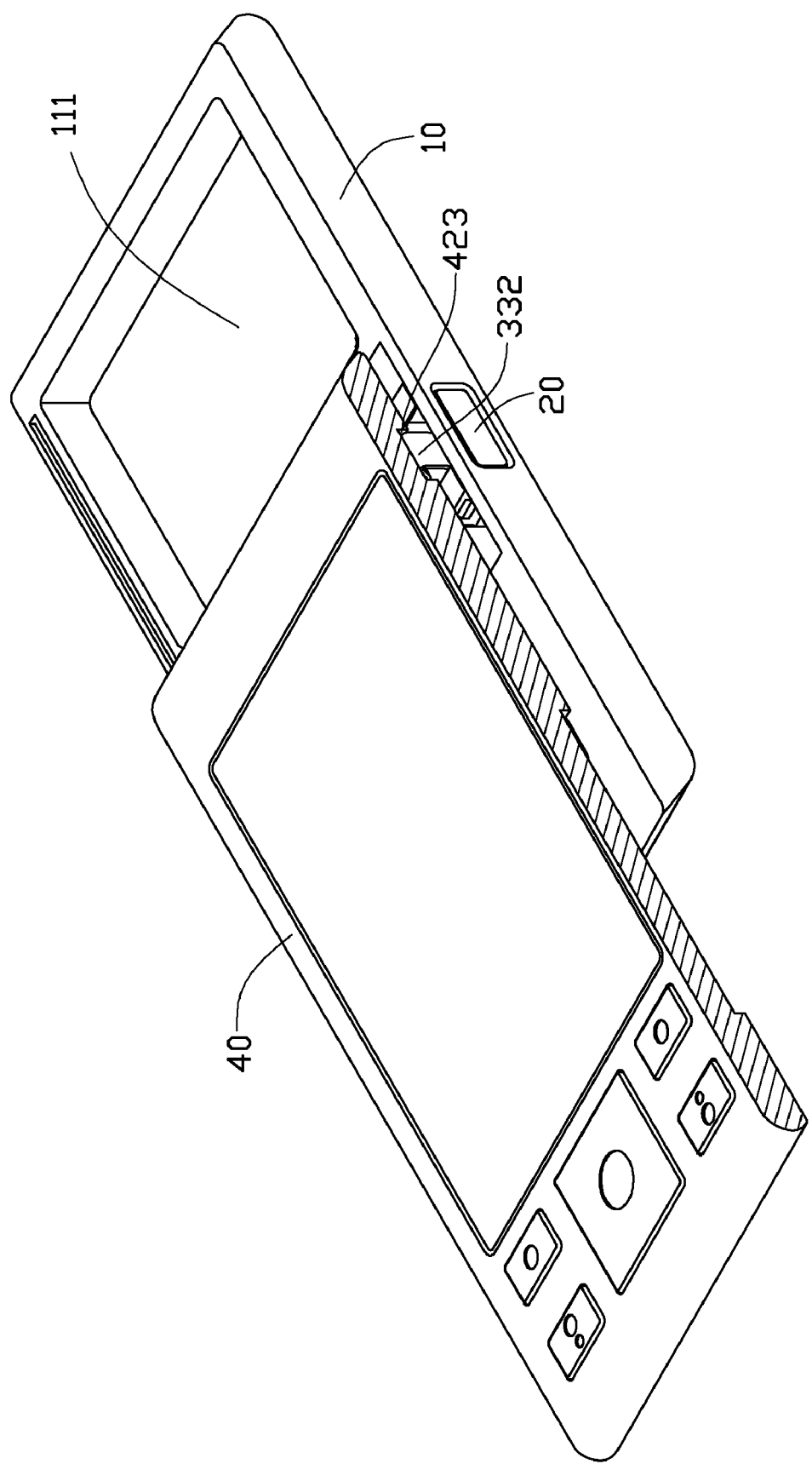
FIG. 7 is similar to FIG. 5, with the battery receiving space exposed.

Referring to FIGS. 6 and 7, to expose the battery receiving space 111, the button 20 is pressed down. At this time, the clamping member 30 is deformed and the resisting portion 332 is released from the sliding groove 422. Then the cover member 40 is slid along the sliding slot 421 towards the bottom wall 12 until the resisting portion 332 latches into the positioning cavity 423. At present, the battery receiving space 111 is completely exposed for a user to replace the battery.

The portable electronic device 100 can cover the battery receiving space 111 using the cover member 40, thus battery cover can be omitted which eliminate the risk of misplacing or loosing the battery cover.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A portable electronic device comprising:
a body member including a battery receiving space and a keypad;
a cover member including a screen, the cover member being slidably mounted to the body member so as to cover the battery receiving space and the keypad.

2. The portable electronic device as claimed in claim 1, wherein the cover member being slidably mounted to the body member along two opposite direction so as to respectively cover the battery receiving space and the keypad.

3. The portable electronic device as claimed in claim 2, further comprising a clamping member mounted in the body member, wherein the clamping member includes a resisting sheet, the resisting sheet resists the cover member to stop the cover member at any position during sliding process.

4. The portable electronic device as claimed in claim 3, wherein the cover member includes a lower wall facing the body member and an upper wall opposite to the lower wall, the screen is disposed on the upper wall, the lower wall defines a sliding groove, the resisting sheet is received in the sliding groove.

5. The portable electronic device as claimed in claim 3 further comprising a button, wherein the button is mounted on the body member, used to release the resisting sheet from the cover member.

6. The portable electronic device as claimed in claim 5, wherein the resisting sheet includes a resisting portion and a clamping portion, the resisting portion resists the cover member, the clamping portion resists the button.

7. The portable electronic device as claimed in claim 6, wherein the button defines a slit, the clamping portion is received in the slit.

8. The portable electronic device as claimed in claim 3, wherein the clamping member further includes a first sheet, two second sheets, and a main sheet, the two second sheets are oppositely disposed on both sides of the main sheet, the first sheet and the resisting sheet are oppositely disposed on another both sides of the main sheet, the main sheet defines a cutout, receiving the resisting sheet therein.

9. The portable electronic device as claimed in claim 8, wherein each second sheet defines a latching hole, the body member includes a protrusion, the latching hole latches with the protrusion, the first sheet elastically resists the body member.

10. The portable electronic device as claimed in claim 4, wherein the lower wall further defines a positioning cavity, the resisting sheet latches into the positioning cavity, and the battery receiving space is completely exposed.

11. A portable electronic device comprising:
a body member including a battery receiving space and a keypad;
a cover member including a plurality of keys, the cover member being slidably mounted to the body member along two opposite direction so as to respectively cover the battery receiving space and the keypad.

12. The portable electronic device as claimed in claim 11 further comprising a clamping member mounted in the body member, wherein the clamping member includes a resisting sheet, the resisting sheet resists the cover member to stop the cover member at any position during sliding process.

13. The portable electronic device as claimed in claim 12, wherein the cover member includes a lower wall facing the body member and an upper wall opposite to the lower wall, the screen is disposed on the upper wall, the lower wall defines a sliding groove, the resisting sheet is received in the sliding groove.

14. The portable electronic device as claimed in claim 12 further comprising a button, wherein the button is mounted on the body member, used to release the resisting sheet from the cover member.

15. The portable electronic device as claimed in claim 14, wherein the resisting sheet includes a resisting portion and a clamping portion, the resisting portion resists the cover member, the clamping portion resists the button.

16. The portable electronic device as claimed in claim 15, wherein the button defines a slit, the clamping portion is received in the slit.

17. The portable electronic device as claimed in claim 12, wherein the clamping member further includes a first sheet, two second sheets, and a main sheet, the two second sheets are oppositely disposed on both sides of the main sheet, the first sheet and the resisting sheet are oppositely disposed on another both sides of the main sheet, the main sheet defines a cutout, receiving the resisting sheet therein.

18. The portable electronic device as claimed in claim 17, wherein each second sheet defines a latching hole, the body member includes a protrusion, the latching hole latches with the protrusion, the first sheet elastically resists the body member.

19. The portable electronic device as claimed in claim 13, wherein the lower wall further defines a positioning cavity, the resisting sheet latches into the positioning cavity, and the battery receiving space is completely exposed.

* * * * *